US011773876B2

(12) United States Patent
Küchle et al.

(10) Patent No.: US 11,773,876 B2
(45) Date of Patent: Oct. 3, 2023

(54) CONTROL VALVE WITH OPTIMIZED CROSS-SECTION

(71) Applicant: Schwäbische Hüttenwerke Automotive GmbH, Aalen (DE)

(72) Inventors: Stefan Küchle, Erolzheim (DE); Thomas Tontsch, Bad Schussenried (DE); Simone Schilling, Ogglshausen (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 0 days.

(21) Appl. No.: 17/586,152

(22) Filed: Jan. 27, 2022

(65) Prior Publication Data
US 2022/0235801 A1 Jul. 28, 2022

(30) Foreign Application Priority Data
Jan. 27, 2021 (DE) ...................... 10 2021 101 830.7

(51) Int. Cl.
| *F16K 27/04* | (2006.01) |
| *F15B 13/042* | (2006.01) |
| *F04B 49/00* | (2006.01) |
| *F04B 49/08* | (2006.01) |
| *F04B 49/24* | (2006.01) |

(Continued)

(52) U.S. Cl.
CPC .......... *F15B 13/042* (2013.01); *F04B 49/002* (2013.01); *F04B 49/08* (2013.01); *F04B 49/24* (2013.01); *F04C 14/24* (2013.01); *F16K 11/0716* (2013.01); *F16K 17/105* (2013.01);
(Continued)

(58) Field of Classification Search
CPC ........ F04B 49/002; F04B 49/08; F04B 49/24; F16K 27/041
See application file for complete search history.

(56) References Cited

U.S. PATENT DOCUMENTS

| 5,839,885 A * | 11/1998 | Oda ...................... F04B 49/002 |
| | | 417/213 |
| 11,028,928 B2 * | 6/2021 | Alger ...................... F16K 3/265 |

(Continued)

FOREIGN PATENT DOCUMENTS

| DE | 2902751 B1 | 6/1980 |
| DE | 10161296 A1 | 9/2002 |

(Continued)

OTHER PUBLICATIONS

German Search Report for German Application No. 10 2021 101 830.7, dated Feb. 7, 2022, with partial translation, 8 pages.
(Continued)

*Primary Examiner* — Kelsey E Cary
(74) *Attorney, Agent, or Firm* — RatnerPrestia

(57) ABSTRACT

A control valve for a pump for delivering a fluid. The control valve includes: a valve housing which delineates a piston chamber; a piston which can be moved within the piston chamber; and a fluid channel which ports into the piston chamber via a port opening, wherein the port opening defines a port control edge. The valve housing includes a recess which extends into the fluid channel, wherein the recess defines a recess control edge which is axially offset with respect to the port control edge, and/or the piston includes a piston recess which defines a piston recess control edge.

16 Claims, 8 Drawing Sheets

(51) Int. Cl.
    *F04C 14/24*     (2006.01)
    *F16K 11/07*     (2006.01)
    *F16K 17/10*     (2006.01)
    *F16K 31/122*    (2006.01)

(52) U.S. Cl.
    CPC ........ *F16K 27/041* (2013.01); *F16K 31/1221* (2013.01)

(56) References Cited

U.S. PATENT DOCUMENTS

| | | | | |
|---|---|---|---|---|
| 2002/0085923 A1* | 7/2002 | Konishi | ............... | F04C 14/226 417/220 |
| 2015/0001024 A1* | 1/2015 | Maurer | ................. | F16D 48/02 192/48.601 |
| 2020/0332911 A1 | 10/2020 | Wechsel et al. | | |

FOREIGN PATENT DOCUMENTS

| | | |
|---|---|---|
| DE | 102008006377 A1 | 7/2009 |
| DE | 102010040302 A1 | 3/2012 |
| DE | 102019205640 A1 | 10/2020 |
| EP | 0049838 A | 4/1982 |

OTHER PUBLICATIONS

Extended European Search Report for European Application No. 22 153 712.9, dated Jul. 15, 2022, with translation, 11 pages.

\* cited by examiner

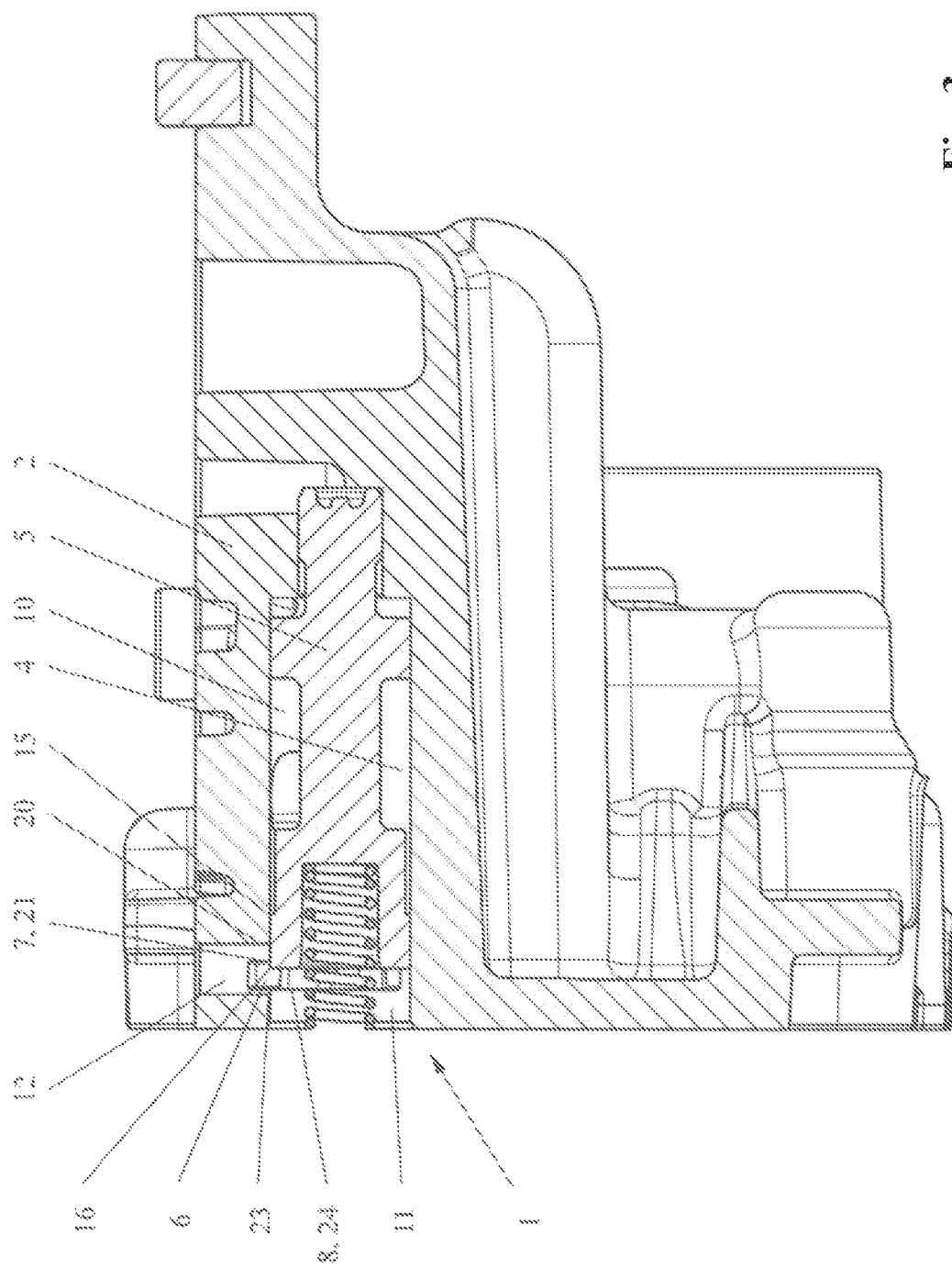

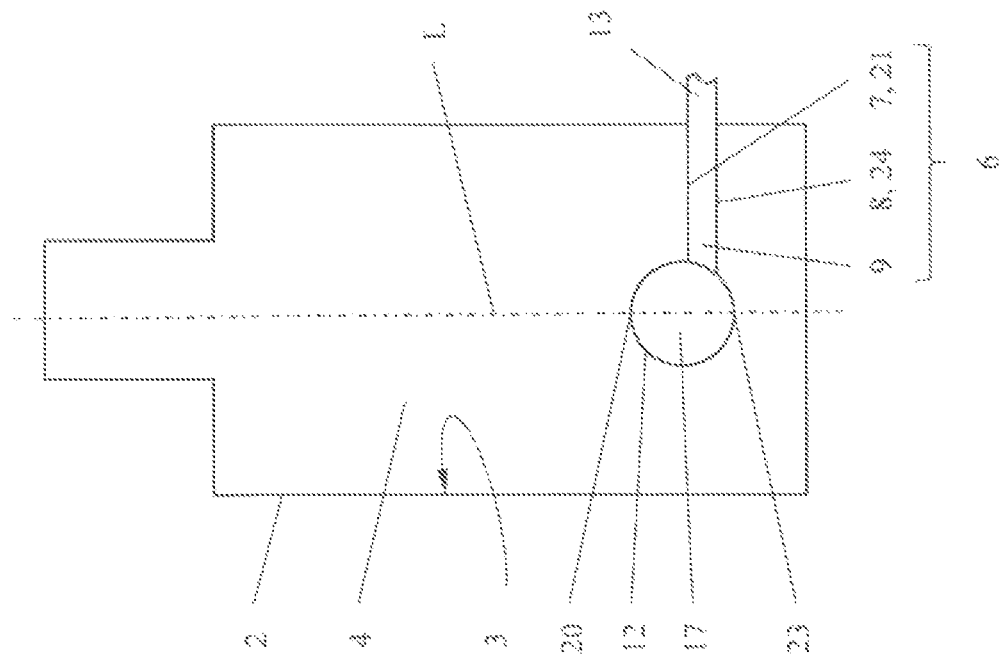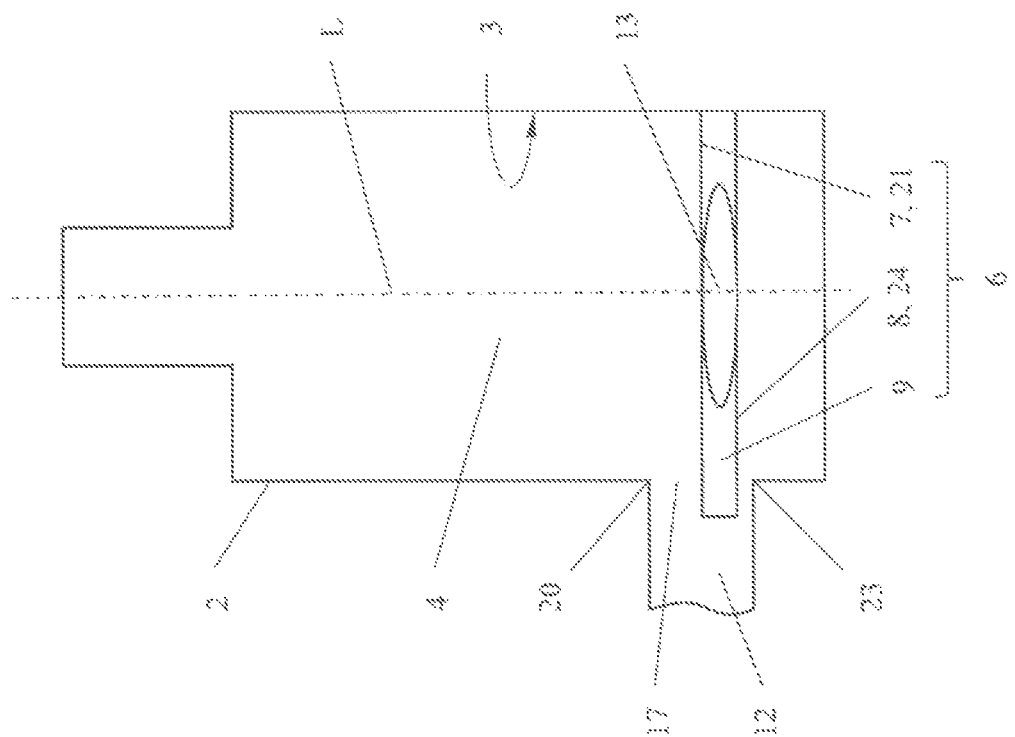

section A-A

CONTROL VALVE WITH OPTIMIZED CROSS-SECTION

CROSS REFERENCE TO RELATED APPLICATION

This application claims benefit of priority from German Patent Application 10 2021 101 830.7, filed Jan. 27, 2021. The contents of this application are incorporated herein by reference.

FIELD OF THE INVENTION

The present invention relates to a control valve for a pump and to a pump comprising such a control valve. The control valve comprises a valve housing which delineates a piston chamber. A movable piston is arranged within the piston chamber. Preferably, the piston can be moved back and forth along its longitudinal axis. The control valve also comprises a fluid channel which ports into the piston chamber via a port opening. The port opening defines a port control edge of the control valve.

BACKGROUND OF THE INVENTION

The prior art discloses control valves which comprise a piston featuring a piston control edge. Depending on its position, the piston closes or opens a port opening of a fluid channel of the control valve, wherein the port opening defines a control edge of the valve housing. The fluid flow between the fluid channel and the piston chamber can be controlled by the interaction between the piston control edge and the control edge of the valve housing. If, for example, the piston completely covers the port opening of the fluid channel, this is referred to as a positive overlap of the piston control edge with respect to the control edge of the valve housing. When it exhibits a positive overlap, the piston seals the piston chamber off from the fluid channel. If the piston is moved within the piston chamber such that the piston control edge approaches and passes the control edge of the valve housing, the port opening of the fluid channel is at least partially uncovered by the piston. A fluid flow between the piston chamber and the fluid channel is then possible. In this state, the piston control edge negatively overlaps the control edge of the valve housing (negative overlap). While the piston control edge passes the control edge of the valve housing, there is a state in which the piston control edge still rests against the control edge of the valve housing, such that a fluid flow between the piston chamber and the fluid channel is not yet possible. In this state, however, even the slightest piston movement in the direction of negative overlap is sufficient to release a fluid flow. This piston position, which defines the transition between positive and negative overlap, is referred to in the following as the zero overlap or zero-section position.

The control valves known from the prior art have the disadvantage that the fluid flow between the fluid channel and the piston chamber, starting from zero overlap up to maximum negative overlap, increases proportionally with the movement of the piston or remains substantially constant. However, it can be advantageous for controlling pumps, in particular pumps for delivering fluids, to combine the proportional increase in the fluid flow or the constant fluid flow with an abrupt increase in the fluid flow.

SUMMARY OF THE INVENTION

A first aspect of the invention is a control valve which exhibits improved control characteristics. A second aspect of the invention is a pump comprising a control valve which exhibits improved control characteristics.

The control valve in accordance with an aspect of the invention is embodied to control a pump which is suitable for delivering a fluid. The control valve comprises a valve housing which delineates a piston chamber and which can be embodied in one or more parts. A piston of the control valve is arranged in the piston chamber such that the piston can be moved axially back and forth, for example along its longitudinal axis. A fluid channel of the control valve ports into the piston chamber via a port opening, wherein the port opening defines a port control edge of the control valve. In accordance with an aspect of the invention, the valve housing comprises a recess which extends into the fluid channel. The recess defines a recess control edge of the control valve which is axially offset in relation to the port control edge. Alternatively, or additionally, the piston comprises a piston recess which defines a piston recess control edge.

In the following, the term "control edge" is understood to mean an edge of the valve housing (housing control edge) or of the piston (piston control edge) which, in conjunction with a control edge of the other control valve element in each case, permits, blocks or abruptly alters a fluid flow. A movement of the piston along its longitudinal axis can for example cause a piston control edge to change from a positive overlap to a negative overlap in relation to a housing control edge, thus permitting or abruptly increasing a fluid flow within or through the control valve. Conversely, a movement of the piston in the opposite direction can cause a piston control edge to change from a negative overlap to a positive overlap in relation to a housing control edge, thus blocking or abruptly limiting a fluid flow within or through the control valve.

Preferably, the port control edge and the recess control edge of the control valve in accordance with an aspect of the invention are embodied as housing control edges and the piston recess control edge is embodied as a piston control edge.

The piston of the control valve in accordance with an aspect of the invention can comprise a piston control edge. The port control edge and recess control edge are advantageously embodied identically in relation to the piston control edge. This means for example that a movement of the piston along its longitudinal axis in a first direction of movement causes the piston control edge to change from a positive overlap to a negative overlap in relation to the port control edge and, if the piston moves further in the first direction of movement, also in relation to the recess control edge. Conversely, a movement of the piston along its longitudinal axis in a second direction of movement can cause the piston control edge to change from a negative overlap to a positive overlap in relation to the recess control edge and, if the piston moves further in the second direction of movement, also in relation to the port control edge.

In an example embodiment, the recess is arranged in the valve housing such that in a sectional view of the piston chamber, the recess control edge and an alignment of the recess control edge form a secant in relation to the outer circumference of the port opening. The alignment of the recess control edge can in particular be formed by an imaginary extension of the recess control edge in the circumferential direction of the valve housing. This example embodiment ensures that the recess extends into the fluid channel and that the recess control edge is axially offset with respect to the port control edge. In a sectional view of the piston chamber, the recess control edge preferably does not form a tangent and/or passant with the alignment of the recess control edge in relation to the outer circumference of the port opening.

The port control edge and/or the recess control edge can be orientated transversely, in particular perpendicularly, in relation to the longitudinal axis.

In another example embodiment, the control valve is embodied such that the cross-section of the piston chamber is increased by the recess. The cross-section of the piston chamber is preferably increased by the recess only in an axial portion of the piston chamber. The axial portion of the piston chamber in which the cross-section of the piston chamber is increased by the recess advantageously extends within the axial extent of the port opening. In other words, the axial extent of the recess which increases the cross-section of the piston chamber is limited to the axial extent of the port opening and is in particular smaller than the axial extent of the port opening.

The recess control edge can be axially offset in relation to the port control edge such that in a first piston position, the piston control edge of the piston negatively overlaps the port control edge and positively overlaps the recess control edge or is in zero overlap with the recess control edge. The port control edge and the recess control edge can be axially offset with respect to each other such that in the first piston position, the piston control edge is situated axially between the port control edge and the recess control edge. Alternatively, the piston control edge can axially overlap with the recess control edge in the first piston position.

Preferably, the port control edge and the recess control edge are axially offset with respect to each other such that in a second piston position, the piston control edge negatively overlaps the port control edge and the recess control edge. In other words, the port control edge and the recess control edge can be axially offset with respect to each other such that in the second piston position, the recess control edge lies between the piston control edge and the port control edge. Advantageously, neither the port control edge nor the recess control edge is axially overlapped by the piston in a seal in the second piston position.

In another example embodiment, the piston and the valve housing delineate a fluid space. The fluid space can be embodied such that it can be fluidically connected to a high-pressure region of the pump or to a low-pressure region of the pump, in particular a fluid reservoir.

In the first piston position, the fluid space can be connected in fluid communication with the fluid channel. In the first piston position, the fluid space is preferably separated, in particular fluidically separated, from the recess by the piston. Separating the fluid space from the recess advantageously means that a direct flow of fluid between the fluid space and the recess is not possible. In the second piston position, the fluid space can be connected in fluid communication with the fluid channel and the recess. This means that in the second piston position, a direct flow of fluid is possible both between the fluid space and the fluid channel and between the fluid space and the recess.

The flow cross-section of the port opening is preferably reduced by the piston to an effective flow cross-section in the first and/or second piston position. Part of the port opening is for example covered by the piston in the first piston position, such that a fluid flow can only flow back and/or forth through part of the port opening between the fluid channel and the fluid space. The part of the port opening through which fluid flows in this case defines the effective flow cross-section. In the second piston position, a fluid flow can also be formed between the fluid space and the recess.

Since the recess extends into the fluid channel, the recess can increase the effective flow cross-section in the second piston position. The effective flow cross-section of the port opening is in particular increased by a flow cross-section of the recess in the second piston position. This increase in the effective flow cross-section advantageously causes an abrupt increase in the fluid flow when the piston changes from the first piston position to the second piston position.

In a third piston position, the piston control edge can positively overlap the port control edge and the recess control edge. Alternatively, the piston control edge can be in zero overlap with the port control edge and positively overlap the recess control edge in the third piston position. The port control edge can be situated axially between the piston control edge and the recess control edge in the third piston position. Alternatively, the piston control edge can axially overlap with the port control edge in the third piston position. In the third piston position, the piston can separate the fluid space from the fluid channel and the recess. Preferably, a fluid flow cannot be formed between the fluid space and the fluid channel or between the fluid space and the recess in the third piston position. In the third piston position, the port opening can be completely covered by the piston.

The inner surface area of the valve housing which faces the piston is advantageously spaced from the outer surface area of the piston by the recess. The recess is in particular axially delineated by a first recess wall and a second recess wall which lies opposite, preferably axially opposite, the first recess wall. The first recess wall and the second recess wall are preferably parallel to each other. Advantageously, one of the two recess walls forms the recess control edge. The first and/or second recess wall can be situated axially within the axial range of extent of the port opening.

The recess can extend at least partially over the circumference of the inner surface area of the valve housing. Alternatively, the recess can also extend over the entire circumference of the inner surface area of the valve housing. The axial distance between the first recess wall and the second recess wall can in particular be smaller than the diameter of the port opening. Independently of this, the axial distance between the first recess wall and the second recess wall can be constant and/or can vary at least in portions over the circumference of the inner surface area of the valve housing.

In another example embodiment, the recess comprises a recess base which exhibits a radial distance from the inner surface area of the valve housing. The recess base can be axially delineated by the first recess wall and the second recess wall. The radial distance between the recess base and the inner surface area of the valve housing can be constant and/or can vary at least in portions over the circumference of the inner surface area of the valve housing.

The recess is preferably embodied as a groove, in particular a crescent-shaped groove. The groove is advantageously open towards the piston chamber.

In another embodiment of the control valve, the fluid channel forms a first fluid channel, wherein the control valve can additionally comprise a second fluid channel. The second fluid channel can port into the recess, in particular into the base of the recess. This advantageously means that the recess forms a passage, preferably a bypass, between the first fluid channel and the second fluid channel. The first and the second fluid channels can be connected in fluid communication with each other via the recess, independently of the piston position of the piston.

Irrespective of this, a third fluid channel can port into the fluid space. Preferably, the third fluid channel fluidically connects the fluid space to a high-pressure region of the pump or to a low-pressure region of the pump.

In another example embodiment, the port opening defines a first port control edge and an additional second port control edge. Preferably, the second port control edge is axially spaced from the first port control edge in accordance with the diameter of the port opening. The second port control edge is advantageously embodied as a housing control edge.

The recess can define a first recess control edge and an additional second recess control edge. The first recess wall can for example define the first recess control edge, and the second recess wall can define the second recess control edge. In a sectional view of the piston chamber, the second recess control edge and an alignment of the second recess control edge can form a secant in relation to the outer circumference of the port opening. The alignment of the second recess control edge can in particular be formed by an imaginary extension of the second recess control edge in the circumferential direction of the valve housing. This example embodiment ensures that the recess extends into the fluid channel and that the second recess control edge is axially offset with respect to the second port control edge. In a sectional view of the piston chamber, the second recess control edge preferably does not form a tangent and/or passant with the alignment of the second recess control edge in relation to the outer circumference of the port opening. The second recess control edge is advantageously embodied as a housing control edge.

The first port control edge and the first recess control edge are preferably similar. The first port control edge and the first recess control edge are in particular similar in relation to the first piston control edge. The second port control edge and the second recess control edge are preferably similar.

The piston can comprise a first piston control edge and an additional second piston control edge. Advantageously, the second port control edge and the second recess control edge are embodied similarly in relation to the second piston control edge. This means for example that a movement of the piston along its longitudinal axis in the first direction of movement causes the second piston control edge to change from a negative overlap to a positive overlap in relation to the second recess control edge and, if the piston moves further in the first direction of movement, also in relation to the second port control edge. Conversely, a movement of the piston along its longitudinal axis in the second direction of movement can cause the second piston control edge to change from a positive overlap to a negative overlap in relation to the second port control edge and, if the piston moves further in the second direction of movement, also in relation to the second recess control edge.

Preferably, the second port control edge and the second recess control edge are embodied in relation to the second piston control edge in a similar way to the first port control edge and the first recess control edge in relation to the first piston control edge. Functionally, the second port control edge and the second recess control edge can be embodied to be contrary to the first port control edge and the first recess control edge. A movement of the piston along its longitudinal axis in the first direction of movement can for example cause the first piston control edge to change from a positive overlap to a negative overlap in relation to the first port control edge, wherein the same movement of the piston causes the second piston control edge to change from a negative overlap to a positive overlap in relation to the second port control edge.

Preferably, the second recess control edge is axially spaced from the second port control edge such that the second piston control edge of the piston negatively overlaps the second port control edge and positively overlaps the second recess control edge or is in zero overlap with the second recess control edge in a fourth piston position. The second piston control edge is preferably situated between the second port control edge and the second recess control edge in the fourth piston position. Alternatively, the second piston control edge can also axially overlap with the second recess control edge in the fourth piston position.

In a fifth piston position, the second piston control edge can negatively overlap the second port control edge and the second recess control edge. The second recess control edge is preferably situated axially between the second piston control edge and the second port control edge in the fifth piston position.

The piston can comprise a first end position along the first direction of movement and a second end position along the second direction of movement. The first end position of the piston preferably corresponds to the first or second piston position. The second end position of the piston can correspond to the fourth or fifth piston position.

In an alternative embodiment of the control valve, the second port control edge can axially overlap with the second recess control edge. In other words, the second port control edge and the second recess control edge coincide in the alternative embodiment, such that they jointly form a single housing control edge. The second port control edge and the second recess control edge can form a common housing control edge in relation to the second piston control edge.

In another example embodiment, the control valve comprises a first fluid space and an additional second fluid space. The piston and the valve housing preferably delineate the second fluid space. The second fluid space is fluidically separated from the first fluid space, in particular by the piston. The second fluid space can be delineated by an end face of the piston and by the valve housing. The volume of the second fluid space can be dependent on the piston position of the piston. The volume of the second fluid space can for example be smaller when the piston is in the first end position than when it is in the second end position.

The first fluid space is advantageously embodied to be able to be fluidically connected to a high-pressure region of the pump. The second fluid space is advantageously embodied to be able to be fluidly connected to a low-pressure region of the pump, in particular a fluid reservoir.

In the fourth piston position, the second fluid space can be connected in fluid communication with the fluid channel and separated, in particular fluidically separated, from the recess by the piston. Separating the second fluid space from the recess advantageously means that a direct flow of fluid between the second fluid space and the recess is not possible. In the fifth piston position, the second fluid space can be connected in fluid communication with the fluid channel and the recess. This means that in the fifth piston position, a direct flow of fluid is possible both between the second fluid space and the fluid channel and between the second fluid space and the recess.

Preferably, the second fluid space is fluidically separated from the fluid channel and from the recess by the piston in the first, second and/or third piston position. This means that in the first, second and/or third piston position in particular, a fluid flow cannot be formed between the second fluid space and the fluid channel or between the second fluid space and the recess.

In the fourth and/or fifth piston position, the first fluid space can be fluidically separated from the fluid channel and from the recess by the piston. This means that in the fourth and/or fifth piston position in particular, a fluid flow preferably cannot be formed between the first fluid space and the fluid channel or between the first fluid space and the recess.

The control valve is intended in particular for use in a motor vehicle. Accordingly, the control valve can be embodied as a motor vehicle valve. The control valve can in particular be embodied as a motor vehicle valve for an engine lubricant pump or for a transmission pump. The control valve is preferably provided for controlling a volume flow of a liquid, in particular a lubricant, coolant and/or actuating medium. Accordingly, the control valve can be embodied as a liquid valve. The liquid can for example be embodied as oil, in particular engine lubricating oil or transmission oil. The control valve can be provided for controlling a volume flow for supplying, lubricating, controlling and/or cooling a motor vehicle drive, in particular a motor vehicle engine, a motor vehicle pump or a motor vehicle transmission.

If the control valve comprises a piston featuring a piston recess, the piston recess defines a piston recess control edge. The piston recess control edge is embodied on the piston. The piston recess can for example be a groove in the outer circumferential surface of the piston. An axial boundary wall of the piston recess can in particular define the piston recess control edge. The piston can comprise a passage. The passage advantageously extends axially from the piston recess up to an end face of the piston, in particular up to an end face of the piston which faces the fluid space. The passage can exhibit a narrowest flow cross-section, wherein the flow cross-section of the passage is preferably smaller than the flow cross-section of the port opening.

Advantageously, the piston recess control edge negatively overlaps the port control edge in a predefined piston position, wherein the piston control edge positively overlaps the port control edge in the same piston position. In other words, in an embodiment in which the piston comprises a piston recess control edge, a fluid flow can be formed between the fluid space and the fluid channel via the piston, in particular via the piston recess and the passage of the piston, even though the piston control edge positively overlaps the port control edge. If, starting from this piston position, the piston is moved in the piston chamber such that the piston control edge is further distanced from the port control edge in the region of positive overlap, the piston recess control edge can also positively overlap the port control edge or exhibit zero overlap with the port control edge. This advantageously means that the fluid space and the fluid channel are only then fluidically separated.

The pump in accordance with an aspect of the invention is suitable for delivering a fluid. The pump comprises a pump housing which delineates a pump chamber. The pump housing can be embodied in one part, in particular as a cast component, or in multiple parts. The pump chamber comprises a pump chamber inlet and a pump chamber outlet. The pump chamber inlet preferably ports into a low-pressure region of the pump chamber. The pump chamber outlet preferably ports into a high-pressure region of the pump chamber. The pump also comprises a delivery rotor in order to deliver the fluid to be delivered from the low-pressure region to the high-pressure region. The delivery rotor can be rotated about an axis of rotation and is enclosed, preferably radially, by an adjusting member which can be moved within the pump chamber. The adjusting member is embodied to adjust the delivery rate of the pump. An actuating chamber for adjusting the adjusting member is embodied between the adjusting member and the pump housing, preferably between the outer surface area of the adjusting member and the inner surface area of the pump housing. A fluid pressure can in particular be applied to the actuating chamber in order to move, in particular pivot, the adjusting member in relation to the pump chamber. The pump comprises a control valve of the type described above, for controlling the fluid pressure within the actuating chamber. Preferably, an increasing or maximum fluid pressure in the actuating chamber results in a reduced or minimum delivery rate of the pump. A decreasing or minimum fluid pressure in the actuating chamber can result in an increasing or maximum delivery rate of the pump.

The pump is in particular a vane cell pump, a toothed wheel pump, in particular an externally toothed wheel pump, or a pendulum-slider pump.

In an example embodiment of the pump, the actuating chamber is connected in fluid communication with the control valve via the fluid channel, in particular the first fluid channel and/or the second fluid channel.

If the piston of the control valve is situated in the first or second piston position, the delivery rate of the pump can decrease. The fluid can for example flow into the actuating chamber of the pump via the control valve and generate a fluid pressure in the actuating chamber when the piston of the control valve is situated in the first or second piston position. The pump can exhibit a minimum delivery rate when the piston of the control valve is situated in the first or second piston position. The fluid space, in particular the first fluid space, is preferably fluidically connected to the high-pressure region of the pump.

If the piston of the control valve is situated in the fourth or fifth piston position, the delivery rate of the pump can increase. In the first or second piston position, the fluid can for example flow off from the actuating chamber of the pump via the control valve. The pump can provide a maximum delivery rate when the piston of the control valve is situated in the fourth or fifth piston position. Preferably, the second fluid space is fluidically connected to the low-pressure region of the pump, in particular a fluid reservoir.

The valve housing of the control valve is preferably formed by the pump housing of the pump.

The pump is intended in particular for use in a motor vehicle. Accordingly, the pump can be embodied as a motor vehicle pump. The pump is preferably provided for delivering a liquid, in particular a lubricant, coolant and/or actuating medium. Accordingly, the pump can be embodied as a liquid pump. The pump is preferably provided for supplying, lubricating and/or cooling a motor vehicle drive, in particular a motor vehicle engine, or a motor vehicle transmission. The liquid is preferably embodied as oil, in particular engine lubricating oil or transmission oil. The pump can be embodied as an engine lubricant pump for a motor vehicle or as a transmission pump for a motor vehicle.

Features of the invention are also described in the aspects formulated below. The aspects are formulated in the manner of claims and can substitute for them. Features disclosed in the aspects can supplement and/or qualify the claims as well as the features described above, indicate alternatives with respect to individual features and/or broaden claim features. Bracketed reference signs refer to example embodiments of the invention illustrated below in figures. They do not restrict the features described in the aspects to their literal sense as such, but do conversely indicate preferred ways of implementing the respective feature.

Aspect 1. A control valve (1) for a pump for delivering a fluid, the control valve (1) comprising:
  (a) a valve housing (2) which delineates a piston chamber (4);
  (b) a piston (5) which can be moved within the piston chamber (4), preferably axially along its longitudinal axis (L); and
  (c) a fluid channel (12) which ports into the piston chamber (4) via a port opening (17), wherein
  (d) the port opening (17) defines a port control edge (20, 23),
  characterized in that
  (e) the valve housing (2) comprises a recess (6) which extends into the fluid channel (12), wherein the recess (6) defines a recess control edge (21, 24) which is axially offset with respect to the port control edge (20, 23), and/or
  (f) the piston (5) comprises a piston recess (25) which defines a piston recess control edge (22).

Aspect 2. The control valve (1) according to the preceding aspect, characterized in that in a sectional view of the piston chamber (4), the recess control edge (21, 24) and an alignment of the recess control edge (21, 24) form a secant in relation to the outer circumference of the port opening (17).

Aspect 3. The control valve (1) according to any one of the preceding aspects, characterized in that the recess (6) increases the cross-sectional area of the piston chamber (4) within the axial extent of the port opening (17).

Aspect 4. The control valve (1) according to any one of the preceding aspects, characterized in that the port control edge (20, 23) and the recess control edge (21, 24) are axially offset with respect to each other such that a piston control edge (15, 16) of the piston (5) negatively overlaps the port control edge (20, 23) and positively overlaps the recess control edge (21, 24) or exhibits zero overlap with the recess control edge (21, 24) in a first piston position.

Aspect 5. The control valve (1) according to Aspect 4, characterized in that the port control edge (20, 23) and the recess control edge (21, 24) are axially offset with respect to each other such that the piston control edge (15, 16) negatively overlaps the port control edge (20, 23) and the recess control edge (21, 24) in a second piston position.

Aspect 6. The control valve (1) according to any one of the preceding aspects, characterized in that a fluid space (10, 11) which is delineated by the piston (5) and valve housing (2) is connected in fluid communication with the fluid channel (12), and a direct flow of fluid between the fluid space (10, 11) and the recess (6) is prevented by the piston (5), in the first piston position.

Aspect 7. The control valve (1) according to Aspect 6, characterized in that the fluid space (10, 11) is connected in fluid communication with the fluid channel (12) and the recess (6) in the second piston position.

Aspect 8. The control valve (1) according to any one of Aspects 4 to 7, characterized in that the flow cross-section of the port opening (17) is reduced by the piston (5) to an effective flow cross-section in the first and/or second piston position, and the recess (6) increases the effective flow cross-section in the second piston position only.

Aspect 9. The control valve (1) according to any one of Aspects 4 to 8, characterized in that the piston (5) fluidly separates the fluid space (10, 11) from the fluid channel (12) and from the recess (6) in a third piston position.

Aspect 10. The control valve (1) according to any one of the preceding aspects, characterized in that the port control edge (20, 23) and the recess control edge (21, 24) are axially offset with respect to each other such that the piston control edge (15, 16) of the piston (5) positively overlaps the port control edge (20, 23) and the recess control edge (21, 24) in a third piston position.

Aspect 11. The control valve (1) according to any one of the preceding aspects, wherein the inner surface area (3) of the valve housing (2) which faces the piston (5) is spaced from the outer surface area of the piston (5) by the recess (6).

Aspect 12. The control valve (1) according to any one of the preceding aspects, characterized in that the recess (6) is axially delineated by a first recess wall (7) and a second recess wall (8) which lies opposite the first recess wall (7), wherein one of the recess walls (7, 8) defines the recess control edge (21, 24).

Aspect 13. The control valve (1) according to the preceding aspect, characterized in that the axial distance between the first recess wall (7) and the second recess wall (8) is smaller than the diameter of the port opening (17).

Aspect 14. The control valve (1) according to any one of Aspects 12 and 13, characterized in that the axial distance between the first recess wall (7) and the second recess wall (8) is constant and/or varies at least in portions over the circumference of the inner surface area (3) of the valve housing (2).

Aspect 15. The control valve (1) according to any one of Aspects 12 to 14, characterized in that the recess (6) comprises a recess base (9) which exhibits a radial distance from the inner surface area (3) of the valve housing (2) and is axially delineated by the first recess wall (7) and the second recess wall (8).

Aspect 16. The control valve (1) according to any one of the preceding aspects, wherein the recess (6) extends at least partially over the circumference of the inner surface area (3) of the valve housing (2) which faces the piston (5).

Aspect 17. The control valve (1) according to any one of the preceding aspects, characterized in that the radial distance between the recess base (9) and the inner surface area (3) of the valve housing (2) is constant and/or varies at least in portions over the circumference of the inner surface area (3) of the valve housing (2).

Aspect 18. The control valve (1) according to any one of the preceding aspects, wherein the recess (6) is a groove (6), preferably a crescent-shaped groove (6) which is open towards the piston chamber (4), in the inner surface area (3) of the valve housing (2).

Aspect 19. The control valve (1) according to any one of the preceding aspects, characterized in that the piston recess (25) is a recess (25), preferably a groove (25), in the outer circumferential surface of the piston (5), wherein the piston recess (25) comprises an axial boundary wall (27) which forms the piston recess control edge (23), and the piston (5) comprises a passage (26) which extends axially from the piston recess (25) up to an end face (29) of the piston (5), wherein the passage (26) exhibits a narrowest flow cross-section which is smaller than the flow cross-section of the port opening (17).

Aspect 20. The control valve (1) according to any one of the preceding aspects, characterized in that the port opening (17) defines a first port control edge (20) and a second port control edge (23), the recess (6) defines a first recess control edge (21) and a second recess control edge (24), and the piston (5) comprises a first piston control edge (15) and a second piston control edge (16), wherein the second port control edge (23) and the second recess control edge (24) are axially offset with respect to each other such that the second piston control edge (16)

negatively overlaps the second port control edge (23) and positively overlaps the second recess control edge (24) or exhibits zero overlap with the second recess control edge (24) in a fourth piston position.

Aspect 21. The control valve (1) according to Aspect 20, characterized in that in a sectional view of the piston chamber (4), the second recess control edge (24) and an alignment of the second recess control edge (24) form a secant in relation to the outer circumference of the port opening (17).

Aspect 22. The control valve (1) according to any one of Aspects 20 and 21, characterized in that the second port control edge (23) and the second recess control edge (24) are axially offset with respect to each other such that the second piston control edge (16) negatively overlaps the second port control edge (23) and the second recess control edge (24) in a fifth piston position.

Aspect 23. The control valve (1) according to any one of Aspects 20 to 22, characterized in that the second piston control edge (16) positively overlaps the second port control edge (23) and the second recess control edge (24) in the first, second and third piston position and/or in that the first piston control edge (16) positively overlaps the port control edge (20) and the recess control edge (21) in the fourth and fifth piston position.

Aspect 24. The control valve (1) according to any one of the preceding aspects, characterized in that the valve housing (2) and the piston (5) delineate a first fluid space (10) and a second fluid space (11), wherein the second fluid space (11) is fluidically separated from the first fluid space (10) by the piston (5).

Aspect 25. The control valve (1) according to Aspect 24, characterized in that the volume of the first fluid space (10) is constant, independently of the piston position of the piston (5), and/or the volume of the second fluid space (11) is variable in accordance with the piston position.

Aspect 26. The control valve (1) according to any one of Aspects 24 and 25, characterized in that the second fluid space (11) is connected in fluid communication with the fluid channel (12), and a direct flow of fluid between the second fluid space (11) and the recess (6) is prevented by the piston (5), in the fourth piston position.

Aspect 27. The control valve (1) according to any one of Aspects 24 to 26, characterized in that the second fluid space (11) is connected in fluid communication with the first fluid channel (12) and the recess (6) in a fifth piston position.

Aspect 28. The control valve (1) according to any one of the preceding aspects, characterized in that a valve spring element (19) which is arranged in the second fluid space (11) exerts a first actuating force on the piston (5).

Aspect 29. The control valve (1) according to Aspect 28, characterized in that the first actuating force moves the piston (5) such that the volume of the second fluid space (11) is increased.

Aspect 30. The control valve (1) according to any one of the preceding aspects, characterized in that the piston (5) comprises a second end face (28) via which an electromagnetically driven control piston and/or an actuating pressure of a control fluid exerts a second actuating force on the piston (5) which moves the piston (5) such that the volume of the second fluid space (11) is decreased.

Aspect 31. The control valve (1) according to any one of the preceding aspects, characterized in that the control valve comprises a first fluid channel (12) and an additional second fluid channel (13), wherein the second fluid channel (13) ports into the recess (6), preferably into the recess base (9) according to Aspect 16.

Aspect 32. The control valve (1) according to Aspect 31, characterized in that the recess (6), preferably a passage (14) formed by the recess (6), connects the first fluid channel (12) in fluid communication with the second fluid channel (13), preferably independently of the piston position.

Aspect 33. The control valve (1) according to any one of the preceding aspects, characterized in that the port opening (17) defines a first port control edge (20) and a second port control edge (23), and the recess (6) defines a first recess control edge (21) and a second recess control edge (24), wherein the second port control edge (23) and the second recess control edge (24) axially overlap and together form a housing control edge (23, 24).

Aspect 34. A pump (30) for delivering a fluid, the pump (30) comprising:
(a) a pump housing (31) which delineates a pump chamber (36), wherein the pump chamber (36) comprises a pump chamber inlet (33) in a low-pressure region, and a pump chamber outlet (34) in a high-pressure region, for the fluid to be delivered;
(b) a delivery rotor (35) which is arranged in the pump chamber (36) and can be rotated about an axis of rotation (R) in order to deliver the fluid from the low-pressure region to the high-pressure region;
(c) an adjusting member (37) in order to adjust the delivery volume of the pump (30), wherein an actuating chamber (38) for adjusting the adjusting member (37) is embodied between the adjusting member (37) and the pump housing (31); and
(d) a control valve (1) according to any one of the preceding aspects, for controlling a fluid pressure in the actuating chamber (38).

Aspect 35. The pump (30) according to Aspect 34, wherein the actuating chamber (38) is connected to the control valve (1) via the first fluid channel (12) and/or the second fluid channel (13).

Aspect 36. The pump (30) according to any one of Aspects 34 and 35 in combination with any one of Aspects 6 and 9, wherein the pump (30) provides a minimum delivery rate or the delivery rate of the pump (30) decreases when the piston is situated in the first or second piston position.

Aspect 37. The pump (30) according to any one of Aspects 34 to 36 in combination with any one of Aspects 22 and 27, wherein the pump (30) exhibits a maximum delivery rate or the delivery rate of the pump (30) increases when the piston is situated in the fourth or fifth piston position.

Aspect 38. The pump (30) according to any one of Aspects 34 to 37, wherein the valve housing (2) is formed by the pump housing (31).

Aspect 39. The pump (30) according to any one of Aspects 34 to 38, wherein the pump (30) is embodied as a motor vehicle pump and/or is suitable for being used in a fluid supply system for a motor vehicle engine and/or for a motor vehicle transmission.

The features described herein can be combined with each other wherever technically expedient and appropriate. Other features, combinations of features and advantages of aspects of the invention follow from the following description of example embodiments on the basis of the figures. There is shown:

BRIEF DESCRIPTION OF THE DRAWINGS

FIG. 3 a second sectional representation of the pump shown in FIG. 1;

FIG. 4 a schematic sectional representation of an example embodiment of a piston chamber of a control valve in accordance with the invention;

FIG. 5 a second schematic sectional representation of the piston chamber shown in FIG. 4;

DETAILED DESCRIPTION OF THE PREFERRED EMBODIMENTS

Figure 1:
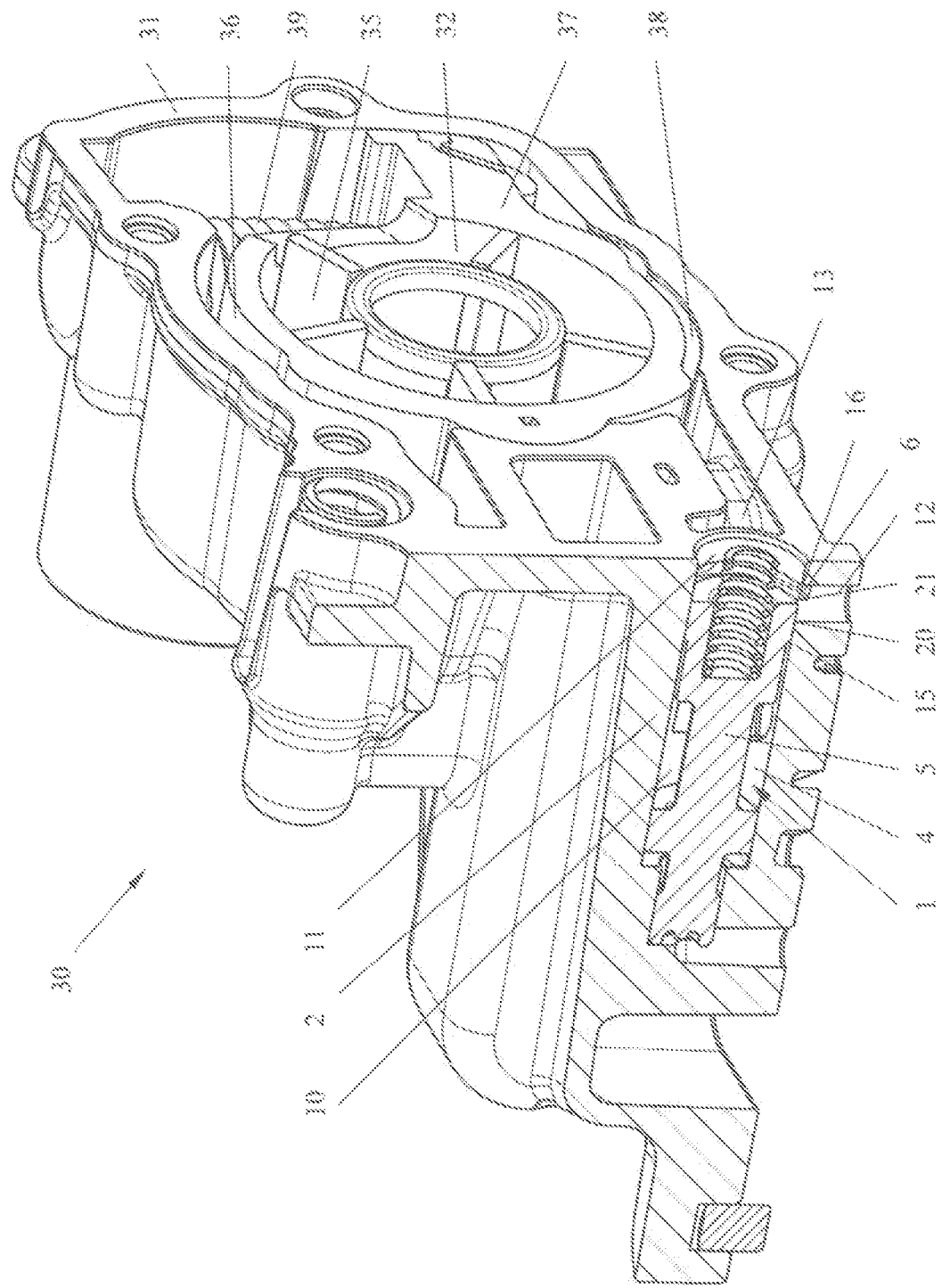
FIG. 1 a perspective sectional representation of an example embodiment of a pump comprising a control valve in accordance with the invention.

FIG. 1 shows a perspective sectional representation of an example embodiment of a pump 30 comprising a control valve 1 in accordance with the invention.

The pump 30 is embodied as a rotary pump 30, in particular a vane cell pump 30, and comprises a pump housing 31. The pump housing 31 delineates a pump chamber 36 in which a preferably pivotable adjusting member 37 and a rotatable delivery rotor 35 are arranged. The delivery rotor 35 comprises multiple vanes which are distributed across the circumference of the delivery rotor 35, wherein each two adjacent vanes respectively delineate a delivery chamber 32 together with the outer surface area of the delivery rotor 35 and the inner surface area of the adjusting member 37.

The adjusting member 37 can be pivoted within the pump chamber 36 such that the adjusting member 37 exhibits a variable eccentricity relative to the axis of rotation of the delivery rotor 35. The delivery volume of the pump 30 can be regulated via the eccentricity of the adjusting member 37 relative to the axis of rotation of the delivery rotor 35. When the pump 30 is in operation, a maximum eccentricity results in a maximum delivery rate of the pump 30. A pump spring element 39 presses the adjusting member 37 into a first position in which the adjusting member 37 exhibits a maximum eccentricity in relation to the delivery rotor 35.

At least one actuating chamber 38 is provided between the inner surface area of the pump housing 31 and the outer surface area of the adjusting member 37 in order to pivot the adjusting member 37 from the first position to a second position, in particular in order to reduce the eccentricity of the adjusting member 37 relative to the delivery rotor 35. If a fluid pressure is applied to the actuating chamber 38, the fluid pressure presses the adjusting member 37 into the second position, against the spring force of the pump spring element 39. The delivery rate of the pump 30 decreases as the eccentricity of the adjusting member 37 relative to the axis of rotation of the delivery rotor 35 decreases.

In the example embodiment shown in FIG. 1, the pump housing 31 simultaneously also forms a valve housing 2 for a control valve 1. The pump housing 31 and/or valve housing 2 delineates a piston chamber 4. A piston 5 which can be moved axially along its longitudinal axis is arranged within the piston chamber 4. The piston 5 and the valve housing 2 jointly delineate a first fluid space 10 and a second fluid space 11.

A first fluid channel 12 which can port into the piston chamber 4 from below, as shown in FIG. 1, defines a first port control edge 20 of the control valve 1 at the port opening to the piston chamber 4. In the example embodiment of the pump 30 shown, the first fluid channel 12 is embodied as a bore. When the pump 30 is fully assembled, the fluid channel 12 can be embodied as a blind channel. This means that the fluid channel 12 does not comprise any port opening other than the port opening to the piston chamber 4 and is in particular closed off in a fluidic seal in relation to the environment of the pump 30. In alternative example embodiments, the fluid channel 12 can be connected in fluid communication with the actuating chamber 38, another actuating chamber and/or the environment.

A recess 6 in the valve housing 2 forms a first recess control edge 21 which exhibits an axial offset in relation to the first port control edge 20. The first port control edge 20 and the first recess control edge 21 are embodied as housing control edges 20, 21, wherein the recess 6 extends over the circumference of the valve housing 2 such that the recess 6 ports and/or extends into the first fluid channel 12.

In the example embodiment shown, the piston 5 comprises a first piston control edge 15 and a second piston control edge 16. A movement of the piston 5 along its longitudinal alters in particular the axial spacing between the first piston control edge 15 and the housing control edges 20, 21, which enables the fluid flow between the first fluid space 10 and the first fluid channel 12 to be regulated in a particularly advantageous way. With regard to the specific mode of operation of the control valve 1, reference is made to FIGS. 4 to 12 and the corresponding description of the figures.

A second fluid channel 13 connects the actuating chamber 38 in fluid communication with the recess 6 of the control valve 1. Since the recess 6 extends into the first fluid channel 12, the second fluid channel 13 is connected in fluid communication with the first fluid channel 12 independently of the position of the piston 5. The recess 6 forms a bypass between the first fluid channel 12 and the second fluid channel 13.

Figure 2:
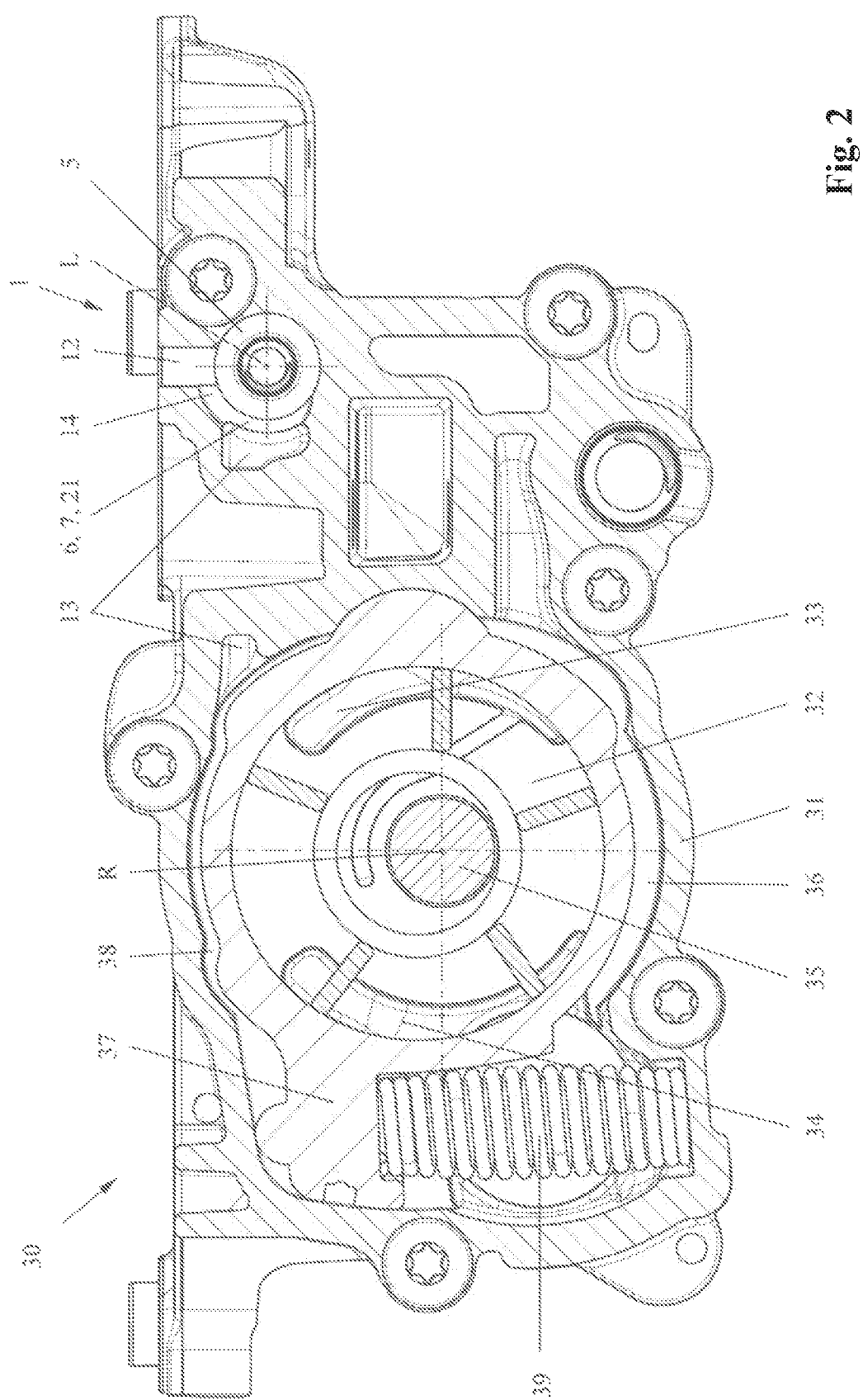
FIG. 2 a sectional representation of the pump shown in FIG. 1.

FIG. 2 shows a lateral sectional representation of the pump 30 from FIG. 1. As is shown, a pump chamber inlet 33 and a pump chamber outlet 34 port into the pump chamber 36 such that when the delivery rotor 35 rotates about the axis of rotation R, a fluid to be delivered is delivered from the pump chamber inlet 33 to the pump chamber outlet 34 through the delivery chambers 32. If the adjusting member 37 is situated in the first position (the position of maximum eccentricity in relation to the axis of rotation R of the delivery rotor 35), the volume of the delivery chambers 32 increases in the region of the pump chamber inlet 33 (the low-pressure region of the pump chamber) in the direction of rotation. The volume of the delivery chambers 32 decreases in the region of the pump chamber outlet 34 (the high-pressure region of the pump chamber). If the adjusting member 37 is situated in the second position (the position of minimum eccentricity in relation to the axis of rotation R of the delivery rotor 35), the volume of the delivery chambers 32 remains substantially the same over the circumference.

The pump 30 advantageously defines the boundary between a low-pressure region and a high-pressure region in a fluid circuit. The high-pressure region of the pump 30 preferably extends from the high-pressure region of the pump chamber up to a consumer, in particular a consumer of the highly pressurized fluid. The low-pressure region of the pump preferably extends from the outlet of the consumer, in particular a fluid outlet of the consumer, up to the low-pressure region of the pump chamber. The low-pressure region of the pump 30 can preferably comprise a fluid reservoir for the fluid to be delivered.

The pump spring element 39 presses the adjusting member 37 into the first position shown in FIG. 2, in which the adjusting member 37 exhibits a maximum eccentricity in relation to the axis of rotation R of the delivery rotor 35. If a fluid pressure is applied to the actuating chamber 38, the fluid pressure in the actuating chamber 38 presses the adjusting member 37 into the second position, against the spring force exerted by the pump spring element 39.

The actuating chamber 38 is connected to the control valve 1 via the second fluid channel 13. The second fluid channel 13 ports into the recess 6 which forms a passage 14 to the first fluid channel 12. The sectional view selected in FIG. 2 shows a first recess wall 7 of the recess 6, wherein the edge of the first recess wall 7 which faces the piston 5 forms the first recess control edge 21 of the control valve 1. With regard to the specific mode of operation of the control valve 1, reference is made to FIGS. 4 to 12 and the corresponding description of the figures.

FIG. 3 shows a sectional representation along the longitudinal axis of the control valve 1 of the pump 30 shown in FIG. 1.

The valve housing 2 of the control valve 1 forms the piston chamber 4 in which the piston 5 is arranged such that it can be moved along its longitudinal axis. The piston 5 and the valve housing 2 jointly delineate the first fluid space 10 and the second fluid space 11.

The first fluid channel 12, which ports radially into the piston chamber 4, forms the first port control edge 20 and a second port control edge 23 with the inner surface area of the piston chamber 4. The first recess wall 7 of the recess 6 of the valve housing 2, shown on the right in FIG. 3, forms the first recess control edge 21. The second recess wall 8 of the recess 6, shown on the left in FIG. 3, forms the second recess control edge 24. The piston 5 comprises a first piston control edge 15, which faces the first fluid space 10, and a second piston control edge 16 which faces the second fluid space 11.

In the piston position shown in FIG. 3, the first piston control edge 15 is situated to the right of the first port control edge 20 and the first recess control edge 21. Accordingly, the first piston control edge 15 exhibits a positive overlap with respect to the first port control edge 20 and the first recess control edge 21. This means that the first fluid space 10 is not connected in fluid communication with either the first fluid channel 12 or the recess 6.

FIG. 4 shows a schematic sectional representation of a piston chamber 4 of an example embodiment of the control valve in accordance with the invention. The piston chamber 4 is formed by a valve housing 2. The piston chamber 4 preferably exhibits a circular-cylindrical shape, wherein an inner surface area 3 of the valve housing 2 radially delineates the piston chamber 4.

A first fluid channel 12, which is depicted in the left-hand region of FIG. 4, ports into the piston chamber 4 via a port opening 17. At the port opening 17 of the fluid channel 12, the fluid channel 12 and the inner surface area 3 of the valve housing 2 together form a first port control edge 20 and a second port control edge 23. In accordance with a piston position of a piston (not depicted in FIG. 4), the port control edges 20, 23 determine the extent to which the fluid channel 12 is connected in fluid communication with the piston chamber 4. Reference is made in this respect to the description of FIGS. 6 to 12.

The valve housing 2 comprises a recess 6 which is embodied as a radial recess 6 in the inner surface area 3. The recess 6 is delineated radially in relation to the longitudinal axis L by a recess base 9 and axially in relation to the longitudinal axis L by a first recess wall 7 and a second recess wall 8 which lies opposite the first recess wall 7. The first recess wall 7 defines a first recess control edge 21. The second recess wall 8 defines a second recess control edge 24.

The first recess control edge 21 is arranged axially between the first port control edge 20 and the second port control edge 23 in relation to the longitudinal axis L of the piston chamber 4. The axial spacing between the first recess control edge 21 and the first port control edge 20 is preferably smaller than the axial spacing between the first recess control edge 21 and the second port control edge 23. The first recess control edge 21 extends in the circumferential direction, level with the first fluid channel 12, such that the recess 6 ports into the first fluid channel 12. In other words, the cross-sectional area of the port opening 17 is increased by the recess 6. This advantageously enables the effective flow cross-section of the port opening 17 to be abruptly increased via the first recess control edge 21 in accordance with the piston position of the piston (not shown). Reference is made in particular to the description of FIGS. 6 and 7.

The second recess control edge 24 is arranged axially between the first port control edge 20 and the second port control edge 23 in relation to the longitudinal axis L of the piston chamber 4. The axial spacing between the second recess control edge 24 and the first port control edge 20 is larger than the axial spacing between the first recess control edge 21 and the first port control edge 20. Accordingly, the axial spacing between the second recess control edge 24 and the second port control edge 23 is smaller than the axial spacing between the first recess control edge 21 and the second port control edge 23. The second recess control edge 24 extends in the circumferential direction, level with the fluid channel 12, such that the recess 6 ports into the fluid channel 12. In other words, the cross-sectional area of the port opening 17 is increased by the recess 6. This advantageously enables the effective flow cross-section of the port opening 17 to be abruptly increased via the second recess control edge 24 in accordance with the piston position of the piston (not shown). Reference is made in particular to the description of FIGS. 10 and 11.

As shown in FIG. 4, a second fluid channel 13 ports into the recess base 9 of the recess 6. The port opening of the second fluid channel 13 exhibits an oval cross-section. Alternatively, the port opening of the second fluid channel 13 can also for example be embodied to be circular, rectangular or polygonal. In the example embodiment shown, the second fluid channel 13 is offset by 90° with respect to the first fluid channel 12 in the circumferential direction in relation to the longitudinal axis L.

FIG. 5 shows another sectional representation of the piston chamber 4 shown in FIG. 4. For the representation in FIG. 5, the piston chamber 4 has been rotated by 90° clockwise about the longitudinal axis L in relation to the representation in FIG. 4.

In the example embodiment shown, the recess 6 extends over only part of the circumference of the piston chamber 4. In other example embodiments, the recess 6 can extend over the entire circumference of the piston chamber 4.

Due to the axial spacing between the first recess control edge 21 and the first port control edge 20 and/or the axial spacing between the first recess control edge 21 and the second port control edge 23, the first recess control edge 21 and/or the first recess control edge 21 together with an imaginary extension of the first recess control edge 21, in particular an alignment of the first recess control edge 21, form(s) a secant in relation to the port opening 17 of the fluid channel 12. The first recess control edge 21 is spaced from the first port control edge 20 and/or second port control edge 23 such that the recess control edge 21 does not form a tangent or passant in relation to the port opening 17.

The second recess control edge 24 is axially spaced from the first port control edge 20 and/or second port control edge 23 such that the second recess control edge 24 and/or the second recess control edge 24 together with an imaginary extension of the second recess control edge 24, in particular an alignment of the second recess control edge 24, form(s) a secant in relation to the port opening 17 of the fluid channel 12. The second recess control edge 24 is spaced from the first port control edge 20 and/or second port control edge 23 such that the second recess control edge 24 does not form a tangent or passant in relation to the port opening 17.

Figure 6:
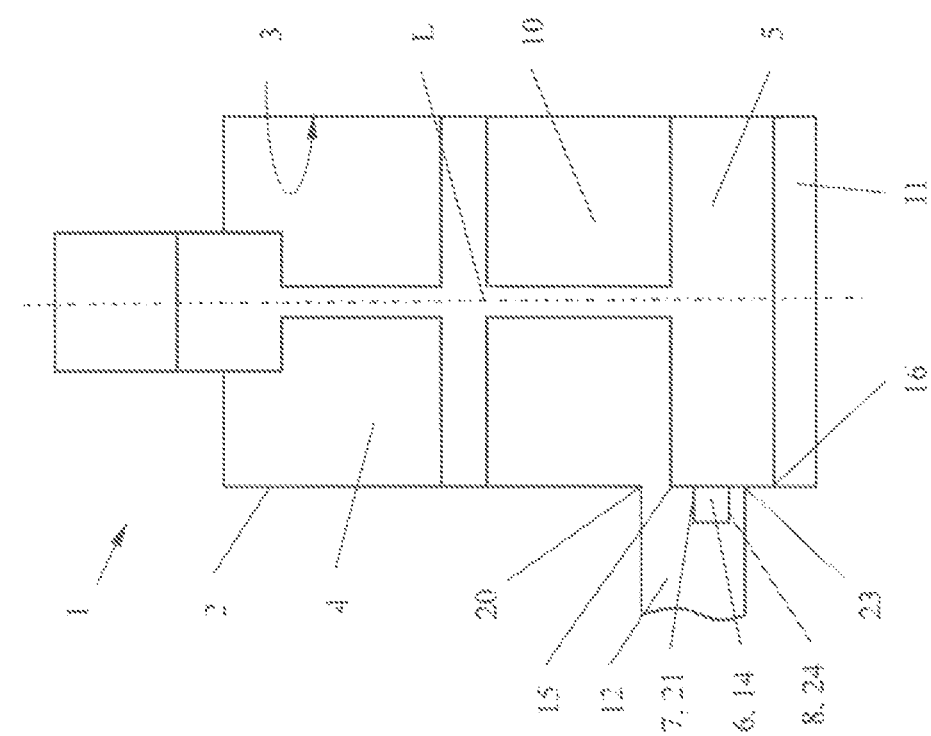
FIG. 6 a schematic sectional representation of an example embodiment of a control valve comprising the piston chamber shown in FIG. 4, in a first piston position.

FIG. 6 shows a schematic sectional representation of a control valve 1 comprising a piston chamber 4 such as is depicted in FIG. 4. A piston 5 which is arranged within the piston chamber 4 can be moved axially along its longitudinal axis L. The piston 5 can in particular be moved in a first direction of movement (from top to bottom in the example embodiment shown) and in a second direction of movement which is opposite to the first direction of movement (i.e. from bottom to top).

The piston 5 comprises a first piston control edge 15 which is an edge of the piston 5 extending over the circumference of the piston 5 and connecting an axial end face of the piston 5 to the outer circumferential wall of the piston 5. The piston 5 also comprises a second piston control edge 16.

The piston 5 and the valve housing 2 delineate a first fluid space 10. The volume of the first fluid space 10 is preferably constant. The piston 5 and the valve housing 2 also delineate a second fluid space 11. In the example embodiment shown, the volume of the second fluid space 11 is critically dependent on the position of the piston 5 within the piston chamber 4, which is referred to in the following as the piston position.

In FIG. 6, the piston 5 is situated in a first piston position. In the first piston position, the first piston control edge 15 negatively overlaps the first port control edge 20 and positively overlaps the first recess control edge 21. The first piston position can however also be defined such that the first piston control edge 15 is in zero overlap with the first recess control edge 21. In the first piston position, the first fluid space 10 is connected in fluid communication with the first fluid channel 12, wherein the piston 5 at least partially overlaps the port opening 17 of the first fluid channel 12. The flow cross-section of the port opening 17 is reduced by the piston 5 to an effective flow cross-section. If the piston 5 is situated in the first piston position, the recess 6 is covered by the piston 5 in such a way that the first fluid space 10 is not directly connected in fluid communication with the recess 6. In other words, a direct flow of fluid cannot be formed between the first fluid space 10 and the recess 6.

The second fluid channel 13, which is covered by the piston 5 in FIG. 6, is connected in fluid communication with the first fluid channel 12 via the recess 6, in particular via the passage 14 formed by the recess 6. Accordingly, a fluid can flow from the first fluid channel 12 into the second fluid channel 13 or from the second fluid channel 13 into the first fluid channel 12 via the passage 14 in the first piston position. In other words, the passage 14 forms a bypass between the first fluid channel 12 and the second fluid channel 13.

As shown in FIG. 6, the piston 5 and the valve housing 2 delineate the second fluid space 11. In the first piston position, the port opening 17 of the first fluid channel 12 and the recess 6 are covered by the piston 5 such that the second fluid space 11 is not connected in fluid communication with either the first fluid channel 12 or the recess 6. In the first piston position, the second port control edge 23 is situated axially between the first port control edge 20 and the second piston control edge 16. In the first piston position, the second piston control edge 16 positively overlaps the second port control edge 23 and the second recess control edge 25.

Figure 7:
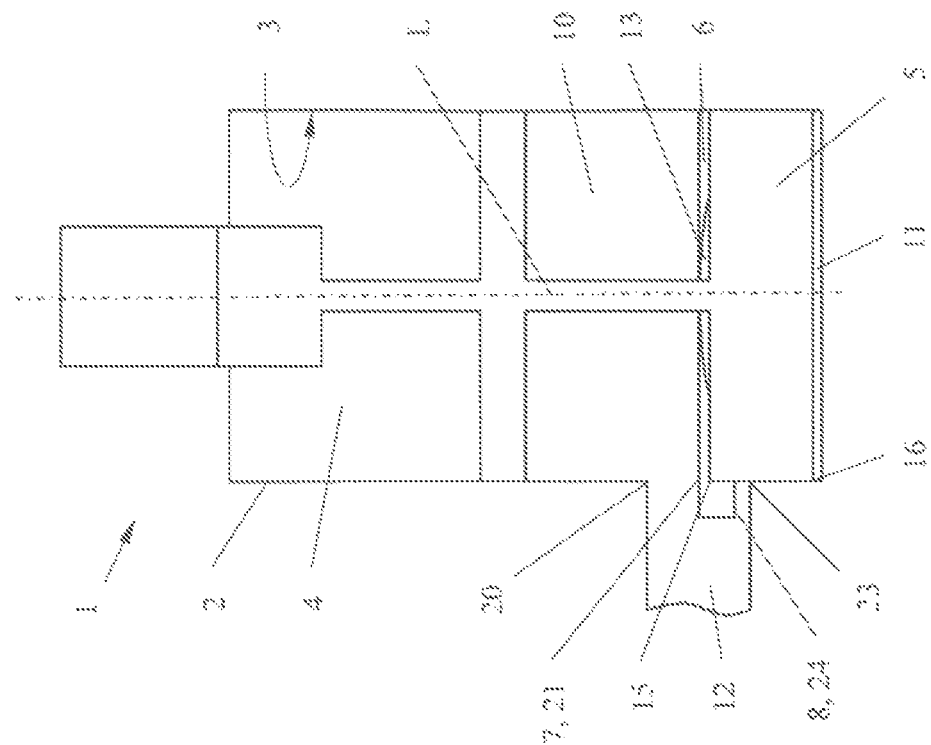
FIG. 7 a schematic sectional representation of the control valve in accordance with FIG. 6, in a second piston position.

The control valve 1 shown schematically in FIG. 7 corresponds to the control valve 1 shown in FIG. 6, wherein the piston 5 is situated in a second piston position. As compared to the first piston position shown in FIG. 6, the piston 5 in FIG. 7 has been moved in the first direction of movement. In FIG. 7, the piston 5 is situated in a first end position which corresponds in particular to the second piston position.

In the second piston position, the first piston control edge 15 is arranged axially between the first recess control edge 21 and the second recess control edge 24. In other words, the first recess control edge 21 is situated axially between the first piston control edge 15 and the first port control edge 20 in the second piston position. In the second piston position, the first piston control edge 15 negatively overlaps the first port control edge 20 and the first recess control edge 21. In the second piston position, the first fluid space 10 is connected in fluid communication with the first fluid channel 12 via the recess 6 and port opening 17. This means that in the second piston position, a direct flow of fluid can also be formed between the first fluid space 10 and the recess 6.

When the control valve 1 is in operation, this advantageously means that when the piston 5 moves from the first piston position to the second piston position, the effective flow cross-section of the port opening 17 is increased not only due to the stroke movement of the piston, but also because the flow cross-section of the passage 14 of the recess 6 forms part of the effective flow cross-section. In other words, the fluid can flow back and/or forth between the first fluid channel 12 and the first fluid space 10 not only via the port opening 17 but also via the passage 14, in the second piston position. Consequently, when changing from the first piston position to the second piston position, a larger fluid flow between the first fluid channel 12 and the first fluid space 10 is abruptly permitted by the control valve 1.

In the second piston position, the port opening 17 of the first fluid channel 12 and the recess 6 are covered by the piston 5 such that the second fluid space 11 is not connected in fluid communication with either the first fluid channel 12 or the recess 6. In the second piston position, the second port control edge 23 is situated axially between the first port control edge 20 and the second piston control edge 16. In the second piston position, the second piston control edge 16 positively overlaps the second port control edge 23 and the second recess control edge 24.

Figure 8:
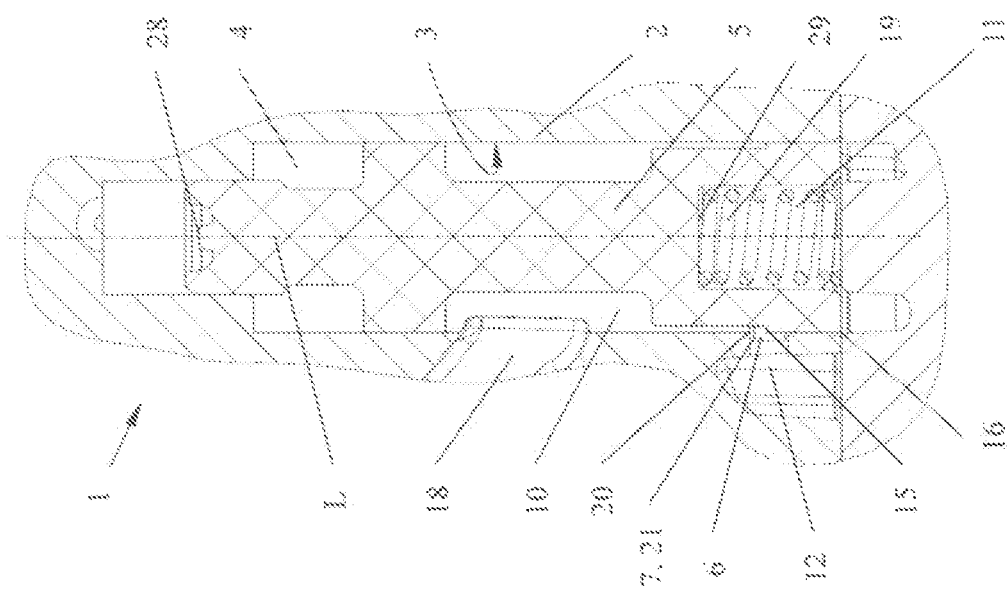
FIG. 8 a sectional representation of the control valve shown in FIG. 1, in the second piston position.

FIG. 8 shows a sectional view of the control valve 1 corresponding to the control valve 1 shown in FIGS. 1 to 3, wherein the piston 5 is situated in the second piston position. In the example embodiment shown, the second piston position again corresponds to the first end position of the piston 5. The second fluid space 11 preferably exhibits a minimum volume in the first end position.

In the central region of the control valve 1 shown in FIG. 8, a third fluid channel 18 ports into the piston chamber 4, in particular into the first fluid space 10. Preferably, the third fluid channel 18 is permanently connected in fluid communication with the first fluid space 10, in particular independently of the piston position of the piston 5. The third fluid channel 18 advantageously connects the first fluid space 10 to the high-pressure region of the pump 30.

Figure 9:
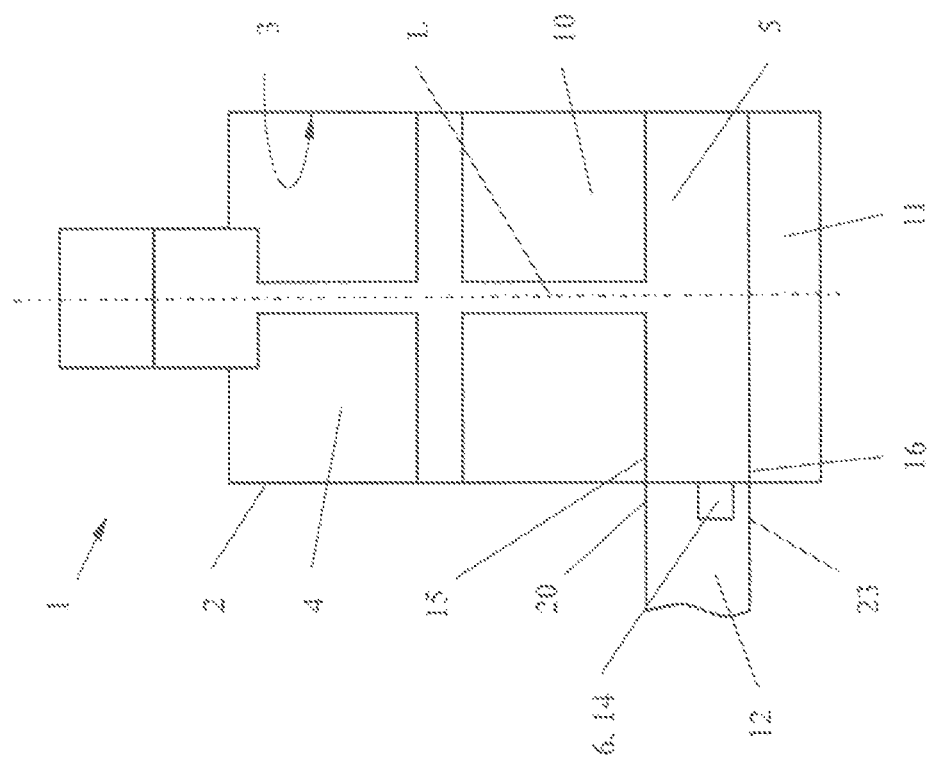
FIG. 9 a schematic sectional representation of the control valve in accordance with FIG. 6, in a third piston position.

The control valve 1 shown schematically in FIG. 9 corresponds to the control valve 1 shown in FIG. 6, wherein the piston 5 is situated in a third piston position.

In the third piston position, the piston 5 completely covers the port opening 17 of the first fluid channel 12. As shown, the first piston control edge 15 axially overlaps with the first port control edge 20, and the second piston control edge 16 axially overlaps with the second port control edge 23. Alternatively, the port control edges 20, 23 of the port opening 17 can also be situated axially between the piston control edges 15, 16. In the third piston position, the first piston control edge 15 positively overlaps the first port control edge 20 and the first recess control edge 21. In the third piston position, the first fluid space 10 is not connected in fluid communication with either the first fluid channel 12 or the recess 6. In the third piston position, the same also applies to the second fluid space 11. In the third piston position, the second piston control edge 16 positively overlaps the second port control edge 23 and the second recess control edge 24.

Figure 10:
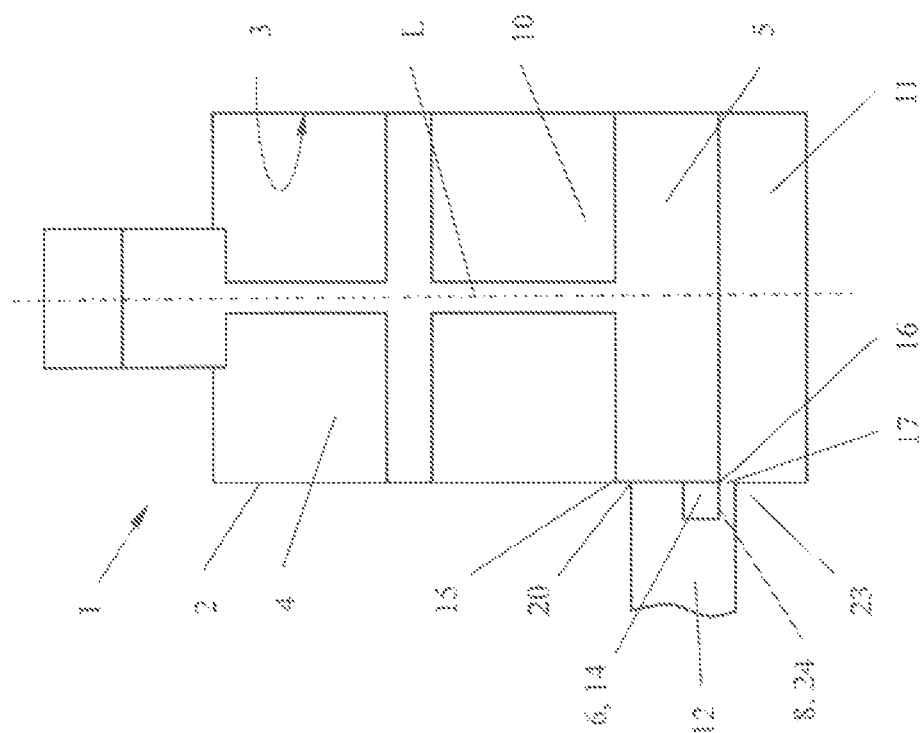
FIG. 10 a schematic sectional representation of the control valve in accordance with FIG. 6, in a fourth piston position.

The control valve 1 shown schematically in FIG. 10 corresponds to the control valve 1 shown in FIG. 6, wherein the piston 5 is situated in a fourth piston position.

In the fourth piston position, the first port control edge 20, the first recess control edge 21 and the second recess control edge 24 are situated between the first piston control edge 15 and the second piston control edge 16. In the fourth piston position, the first fluid space 10 is fluidly separated from the first fluid channel 12 and the recess 6 by the piston 5. In the fourth piston position, the first piston control edge 15 positively overlaps the first port control edge 20 and the first recess control edge 21.

In the fourth piston position, the first fluid channel 12 is connected in fluid communication with the second fluid channel 13, which is covered by the piston 5 in FIG. 10, via the passage 14 formed by the recess 6. Accordingly, a fluid can flow from the first fluid channel 12 into the second fluid channel 13 or from the second fluid channel 13 into the first fluid channel 12 via the passage 14 in the fourth piston position. In other words, the passage 14 forms a bypass between the first fluid channel 12 and the second fluid channel 13.

In the fourth piston position, the second piston control edge 16 axially overlaps with the second recess control edge 24. In the fourth piston position, the second fluid space 11 is connected in fluid communication with the first fluid channel 12, wherein the piston 5 at least partially overlaps the port opening 17 of the first fluid channel 12, such that the flow cross-section of the port opening 17 is reduced by the piston 5 to an effective flow cross-section. In the fourth piston position, the second piston control edge 16 negatively overlaps the second port control edge 23 and positively overlaps the second recess control edge 24. Alternatively, the second piston control edge 16 can be in zero overlap with the second recess control edge 24 in the fourth piston position.

In the fourth piston position shown in FIG. 10, the recess 6 is covered by the piston 5 in such a way that the second fluid space 11 is not directly connected in fluid communication with the recess 6. In other words, a fluid cannot flow from the first fluid channel 12 into the second fluid space 11 or from the second fluid space 11 into the first fluid channel 12 via the recess 6.

Figure 11:
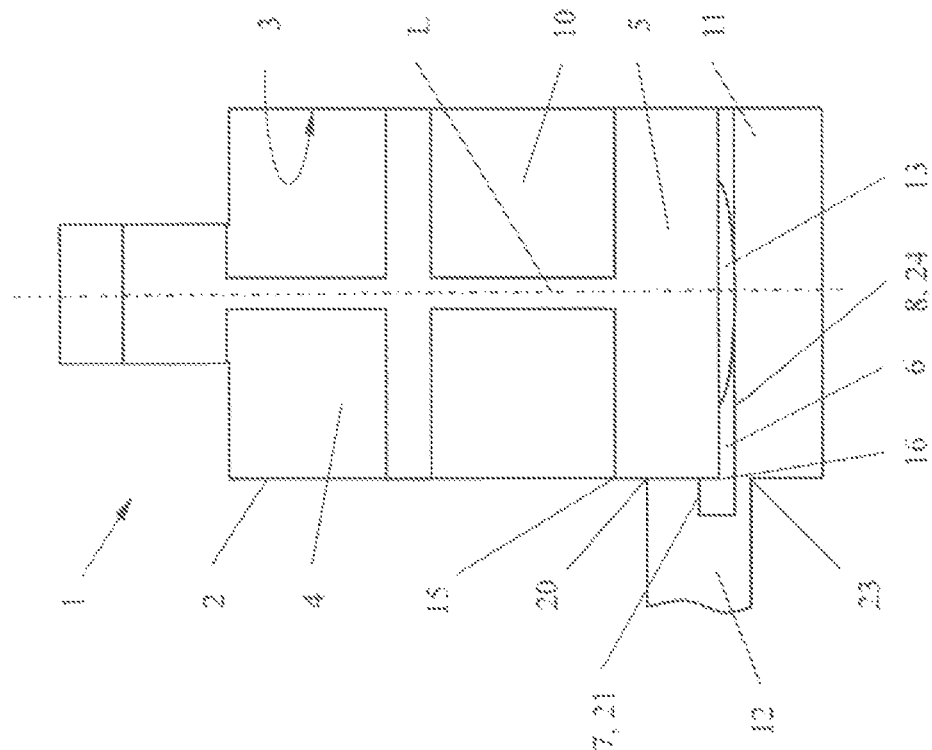
FIG. 11 a schematic sectional representation of the control valve in accordance with FIG. 6, in a fifth piston position.

The control valve 1 shown schematically in FIG. 11 corresponds to the control valve 1 shown in FIG. 6, wherein the piston 5 is situated in a fifth piston position. The fifth piston position preferably corresponds to the second end position of the piston 5.

In the fifth piston position, the first port control edge 20 and the first recess control edge 21 are situated between the first piston control edge 15 and the second piston control edge 16. In the fifth piston position, the first fluid space 10 is fluidically separated from the first fluid channel 12 and the recess 6 by the piston 5. In the fifth piston position, the first piston control edge 15 positively overlaps the first port control edge 20 and the first recess control edge 21.

In the fifth piston position shown in FIG. 11, the second piston control edge 16 is situated axially between the first recess control edge 21 and the second recess control edge 24. In the fifth piston position, the second fluid space 11 is connected in fluid communication with the fluid channel 12 via the recess 6 and port opening 17.

If the piston 5 is in the fifth piston position, the second fluid space 11 is connected in fluid communication with the second fluid channel 13 via the recess 6. Accordingly, a fluid can flow from the second fluid channel 13 into the second fluid space 11 or from the second fluid space 11 into the second fluid channel 13 via the recess 6. In the fifth piston position, the second piston control edge 16 negatively overlaps the second port control edge 23 and the second recess control edge 24.

When the control valve 1 is in operation, this advantageously means that when the piston 5 moves from the fourth piston position to the fifth piston position, the effective flow cross-section of the port opening 17 is increased not only due to the stroke movement of the piston, but also because the flow cross-section of the passage 14 of the recess 6 forms part of the effective flow cross-section. In other words, the fluid can flow back and/or forth between the first fluid channel 12 and the second fluid space 11 not only via the port opening 17 but also via the passage 14 of the recess 6, in the fifth piston position. Consequently, when changing from the fourth piston position to the fifth piston position, a larger fluid flow between the first fluid channel 12 and the second fluid space 11 is abruptly permitted by the control valve 1.

Figure 12:
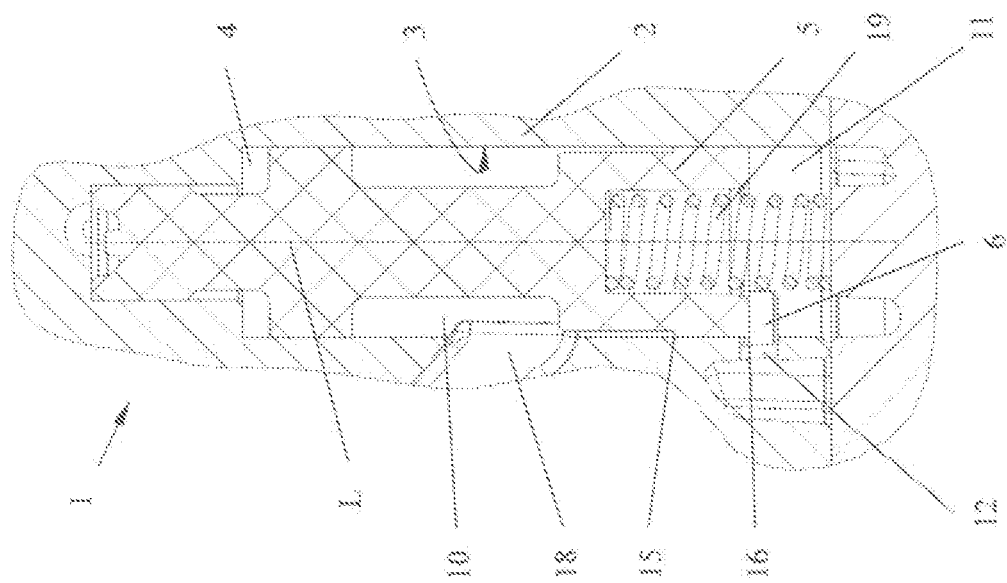
FIG. 12 a sectional representation of the control valve shown in FIG. 1, in the fifth piston position.

FIG. 12 shows a sectional view of the control valve 1 corresponding to the control valve 1 shown in FIGS. 1 to 3 and 8, wherein the piston 5 is situated in the fifth piston position. In the example embodiment shown, the fifth piston position is a second end position of the piston 5, in which the second fluid space 11 preferably exhibits a maximum volume.

Figure 13:
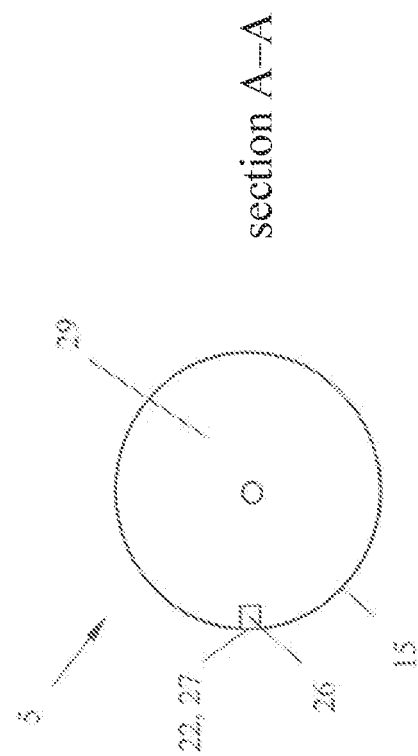
FIG. 13 a schematic sectional representation of an example embodiment of a piston in accordance with the invention.

FIG. 13 shows a schematic sectional representation of an example embodiment of a piston 5 comprising a piston recess 25. An axial boundary wall 27 of the piston recess 25 forms a piston recess control edge 22. The piston recess control edge 22 can consequently also be referred to as the third piston control edge 22.

In the example embodiment shown, the piston recess 25 extends over the entire circumference of the piston 5. Alternatively, the piston recess 25 can also extend over only part of the circumference of the piston 5. The piston recess 25 is arranged axially between the first piston control edge 15 and the second piston control edge 16, such that the piston recess control edge 22 is also situated axially between the first piston control edge 15 and the second piston control edge 16.

The end face 29 of the piston 5 comprises a piston passage 26. When the piston 5 is assembled, the piston passage 26 connects the piston recess 25 in fluid communication with a fluid space which faces the end face 29.

Figure 14:
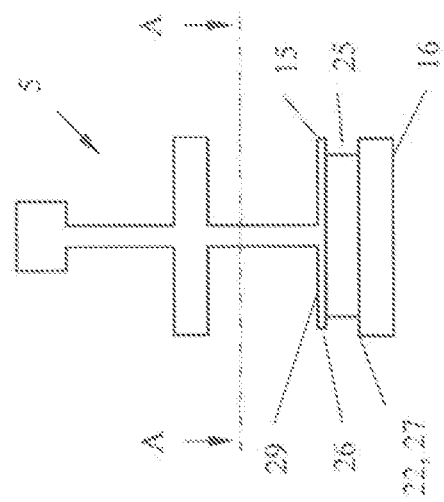
FIG. 14 a side view of the piston shown in FIG. 13.

FIG. 14 shows the sectional view A-A indicated in FIG. 13. In the example embodiment shown, the piston passage 26 is arranged in the left-hand region of the end face 29 only. In alternative example embodiments, the piston 5 can comprise a plurality of piston passages 26.

| List of reference signs | |
|---|---|
| 1 | control valve |
| 2 | valve housing |
| 3 | inner surface area of the valve housing |
| 4 | piston chamber |
| 5 | piston |
| 6 | recess |
| 7 | first recess wall |
| 8 | second recess wall |
| 9 | recess base |
| 10 | first fluid space |
| 11 | second fluid space |
| 12 | first fluid channel |
| 13 | second fluid channel |
| 14 | passage |
| 15 | first piston control edge |
| 16 | second piston control edge |
| 17 | port opening |
| 18 | third fluid channel |
| 19 | valve spring element |
| L | longitudinal axis of the piston chamber |
| R | axis of rotation of the delivery rotor |
| 20 | first port control edge |
| 21 | first recess control edge |
| 22 | piston recess control edge |
| 23 | second port control edge |
| 24 | second recess control edge |
| 25 | piston recess |
| 26 | piston passage |
| 27 | axial boundary wall |
| 28 | end face of the piston |
| 29 | end face of the piston |
| 30 | pump |
| 31 | pump housing |
| 32 | delivery chamber |
| 33 | pump chamber inlet |
| 34 | pump chamber outlet |
| 35 | delivery rotor |
| 36 | pump chamber |
| 37 | adjusting member |
| 38 | actuating chamber |
| 39 | pump spring element |

The invention claimed is:

1. A control valve for a pump for delivering a fluid, the control valve comprising:
(a) a valve housing which delineates a piston chamber;
(b) a piston which can be moved within the piston chamber, axially along its longitudinal axis; and
(c) a fluid channel which ports into the piston chamber via a port opening, wherein
(d) the port opening defines a port control edge, wherein
(e) the valve housing comprises a recess which extends into the fluid channel, wherein the recess defines a recess control edge which is axially offset with respect to the port control edge, and/or
(f) the piston comprises a piston recess which defines a piston recess control edge,
wherein in a sectional view of the piston chamber, the recess control edge and an alignment of the recess control edge form a secant in relation to the outer circumference of the port opening.

2. The control valve according to claim 1, wherein the recess increases the cross-sectional area of the piston chamber within the axial extent of the port opening.

3. The control valve according to claim 1, wherein the port control edge and the recess control edge are axially offset with respect to each other such that a piston control edge of the piston negatively overlaps the port control edge and positively overlaps the recess control edge or exhibits zero overlap with the recess control edge in a first piston position.

4. The control valve according to claim 3, wherein the port control edge and the recess control edge are axially offset with respect to each other such that the piston control edge negatively overlaps the port control edge and the recess control edge in a second piston position.

5. The control valve according to claim 1, wherein a fluid space which is delineated by the piston and valve housing is connected in fluid communication with the fluid channel, and a direct flow of fluid between the fluid space and the recess is prevented by the piston, in a first piston position.

6. The control valve according to claim 5, wherein the fluid space is connected in direct fluid communication with the fluid channel and the recess in a second piston position.

7. The control valve according to claim 5, wherein the piston fluidly separates the fluid space from the fluid channel and from the recess in a third piston position.

8. The control valve according to claim 1, wherein the control valve comprises a first fluid space and an additional second fluid space, and the second fluid space is fluidically separated from the fluid channel in a first, second and/or third piston position and fluidically connected to the fluid channel in a fourth piston position.

9. The control valve according to claim 8, wherein the piston comprises a first end position along a first direction of movement and a second end position along a second direction of movement which is opposite to the first direction of movement, wherein the piston assumes the first or second piston position in the first end position and assumes the fourth piston position in the second end position.

10. The control valve according claim 1, wherein the recess is axially delineated by a first recess wall and a second recess wall which lies opposite the first recess wall, wherein one of the recess walls defines the recess control edge.

11. The control valve according to claim 1, wherein the recess is a groove which is open towards the piston chamber, in the inner surface area of the valve housing.

12. The control valve according to claim 1, wherein the piston recess is a recess in the outer circumferential surface of the piston, wherein the piston recess comprises an axial boundary wall which forms the piston recess control edge, and the piston comprises a passage which extends axially from the piston recess up to an end face of the piston, wherein the passage exhibits a narrowest flow cross-section which is smaller than the flow cross-section of the port opening.

13. A pump for delivering a fluid, the pump comprising:
(a) a pump housing which delineates a pump chamber, wherein the pump chamber comprises a pump chamber inlet in a low-pressure region, and a pump chamber outlet in a high-pressure region, for the fluid to be delivered;
(b) a delivery rotor which is arranged in the pump chamber and can be rotated about an axis of rotation in order to deliver the fluid from the low-pressure region to the high-pressure region;
(c) an adjusting member in order to adjust the delivery volume of the pump, wherein an actuating chamber for adjusting the adjusting member is embodied between the adjusting member and the pump housing; and
(d) a control valve according to claim 1, for controlling a fluid pressure in the actuating chamber.

14. The control valve according to claim 1, wherein the piston recess is a groove in the outer circumferential surface of the piston, wherein the piston recess comprises an axial boundary wall which forms the piston recess control edge, and the piston comprises a passage which extends axially from the piston recess up to an end face of the piston, wherein the passage exhibits a narrowest flow cross-section which is smaller than the flow cross-section of the port opening.

15. A control valve for a pump for delivering a fluid, the control valve comprising:
(a) a valve housing which delineates a piston chamber;
(b) a piston which can be moved within the piston chamber, axially along its longitudinal axis; and
(c) a fluid channel which ports into the piston chamber via a port opening, wherein
(d) the port opening defines a port control edge, wherein
(e) the valve housing comprises a recess which extends into the fluid channel, wherein the recess defines a recess control edge which is axially offset with respect to the port control edge, and/or
(f) the piston comprises a piston recess which defines a piston recess control edge, wherein the flow cross-section of the port opening is reduced by the piston to an effective flow cross-section in a first and/or second piston position, and the recess increases the effective flow cross-section in the second piston position only.

16. A control valve for a pump for delivering a fluid, the control valve comprising:
(a) a valve housing which delineates a piston chamber;
(b) a piston which can be moved within the piston chamber, axially along its longitudinal axis; and
(c) a fluid channel which ports into the piston chamber via a port opening, wherein
(d) the port opening defines a port control edge, wherein
(e) the valve housing comprises a recess which extends into the fluid channel, wherein the recess defines a recess control edge which is axially offset with respect to the port control edge, and/or
(f) the piston comprises a piston recess which defines a piston recess control edge, wherein the recess is a crescent-shaped groove which is open towards the piston chamber, in the inner surface area of the valve housing.

* * * * *